UNITED STATES PATENT OFFICE.

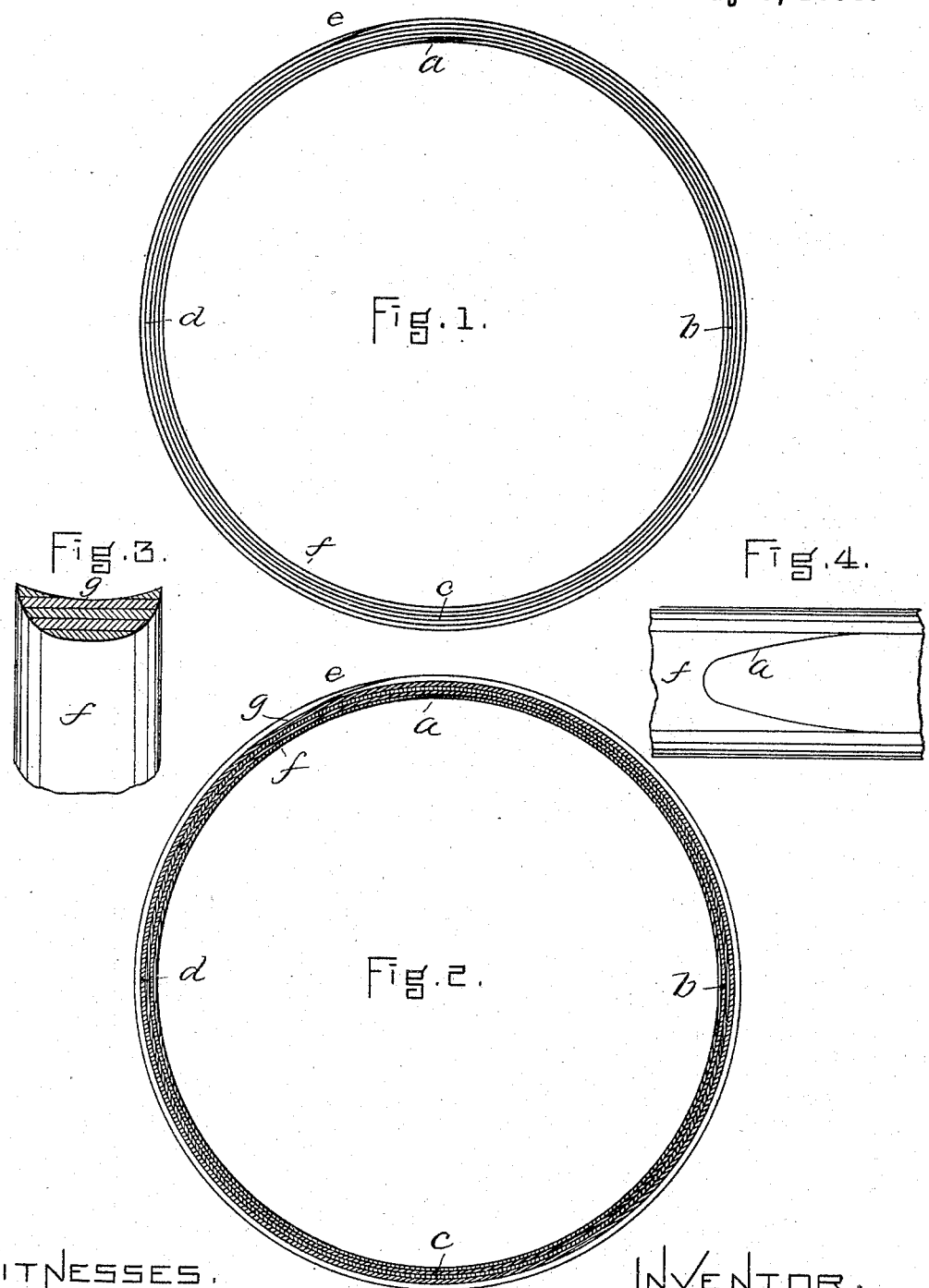

ALBERT C. FAIRBANKS, OF SOMERVILLE, AND PETER J. BERLO, OF BOSTON, ASSIGNORS, BY DIRECT AND MESNE ASSIGNMENTS, TO EMMA T. FAIRBANKS, OF BOSTON, MASSACHUSETTS.

RIM FOR BICYCLE-WHEELS.

SPECIFICATION forming part of Letters Patent No. 496,971, dated May 9, 1893.

Application filed August 22, 1892. Serial No. 443,729. (No model.)

*To all whom it may concern:*

Be it known that we, ALBERT C. FAIRBANKS, of Somerville, in the county of Middlesex, and PETER J. BERLO, of Boston, in the county of Suffolk, State of Massachusetts, have invented certain new and useful Improvements in Rims for Bicycle-Wheels, of which the following is a specification.

Our invention has relation to bicycle and other analogous vehicle wheels; and it is the purpose of our invention to provide such improvements in the rims of wheels as will render the same considerably lighter in weight, and stiffer in, and stronger of construction than heretofore, besides possessing other important advantages.

To these ends our invention consists of a rim for a bicycle wheel comprising in its construction a series of sections or plies of wood, of varying course of direction of grain, bent to proper circular form and cemented together, each section breaking joint with each of the other sections, and the rim so formed having an inner convex surface, and an outer concave surface, all as will hereinafter more fully appear.

Reference is to be had to the annexed drawings, and to the letters marked thereon, forming a part of this specification, the same letters designating the same parts or features, as the case may be, wherever they occur.

Of the drawings, Figure 1 is a side view of our invention. Fig. 2 is a central, circular sectional view of the same. Fig. 3 is a cross section of the same. Fig. 4 is a detail view showing the manner in which the ends of the innermost section may be joined.

In carrying out our invention we take strips or plies of wood capable of being bent, and of suitable strength and grain, and bend them over or around a suitable former, one strip upon another, firmly and securely cementing the several strips together, and in like manner joining the ends of each.

The wheel rim shown in the drawings is composed of five strips or plies, though a greater or less number may be employed, as circumstances may suggest. In any case it is desirable that the grain of each strip or ply shall vary, to some extent with the adjacent strip or strips. The ends of the inner and outer plies may be feathered, so that one feathered end may overlap the other, as indicated at $a$, and the ends of the others may be connected in like manner or be joined by square joints, the next inner layer or ply breaking joint, (considered with respect to the joint $a$) at the quarter $b$, the central layer, at the half circle $c$; the next to the outer layer at the quarter $d$, and the outer layer at a point between any of the quarters, as, for example at $e$.

The order in which the several layers or sections break joint may be varied from that above given, it being desirable only that no two joints should fall in the same plane.

To complete the rim the inner surface $f$ is rounded or made of convex form, while the outer surface $g$ is concaved so as to adapt it to have a tire of any desired kind applied thereto.

In constructing our improved rim for bicycle wheels we prefer to employ dry seasoned wood, in order to avoid shrinkage incidental to the drying of steamed wood, though we do not confine our invention to any particular mode of manufacture.

A bicycle wheel constructed with a rim made in accordance with our invention, is found to be much lighter, stiffer, and more durable than metallic as now constructed for the same service. Furthermore, the employment of a rim in bicycle wheels made in accordance with our invention, results in an action of buoyant tendency, so very desirable in the use of bicycles, velocipedes, &c. Moreover, in case the user of a bicycle equipped with our invention should collide with or encounter or run against any object of great stability there would be no liability of indenting or bending the rim of the wheel, as is the case with metallic wheels as now commonly constructed.

Having thus described the nature of our invention, we declare that what we claim is—

A rim for bicycle wheels comprising in its construction a series of sections or plies of wood of varying course or direction of grain, cemented together, the ends of each section breaking joints with the ends of adjacent sections, and the inner surface $f$ being of convex form, and the outer surface $g$ of concave form, as set forth.

In testimony whereof we have signed our names to this specification, in the presence of two subscribing witnesses, this 13th day of August, A. D. 1892.

ALBERT C. FAIRBANKS.
PETER J. BERLO.

Witnesses:
ARTHUR W. CROSSLEY,
WALTER S. McLEOD.